United States Patent
Son et al.

(10) Patent No.: US 6,278,887 B1
(45) Date of Patent: Aug. 21, 2001

(54) SYSTEM AND METHOD FOR POWER CONSERVATION IN A WIRELESS COMMUNICATION HANDSET

(75) Inventors: William Y. Son; Jong T. Chung, both of San Diego, CA (US)

(73) Assignee: Neopoint, Inc., La Jolla, CA (US)

(*) Notice: Subject to any disclaimer, the term of this patent is extended or adjusted under 35 U.S.C. 154(b) by 0 days.

(21) Appl. No.: 09/245,827

(22) Filed: Feb. 5, 1999

(51) Int. Cl.[7] ................ H04B 1/16; G09G 3/36
(52) U.S. Cl. ............ 455/566; 455/38.3; 455/158.4; 455/159.1; 455/550; 455/574; 455/343; 345/211
(58) Field of Search .................... 455/566, 550, 455/575, 90, 159.1, 158.4, 574, 38.3, 343; 345/52, 102, 211, 212; 349/61

(56) References Cited

U.S. PATENT DOCUMENTS

| | | | |
|---|---|---|---|
| 4,982,424 | * 1/1991 | Saito et al. | 379/376 |
| 5,337,073 | * 8/1994 | Tsunoda et al. | 345/102 |
| 5,406,305 | * 4/1995 | Shimomura et al. | 345/102 |
| 5,548,832 | 8/1996 | Karam . | |
| 5,570,421 | * 10/1996 | Morishima | 379/396 |
| 5,684,294 | * 11/1997 | Kouhi | 250/214 AL |
| 5,752,195 | * 5/1998 | Tsuji et al. | 455/462 |
| 5,760,760 | * 6/1998 | Helms | 345/102 |
| 5,815,228 | * 9/1998 | Flynn | 349/71 |
| 5,881,377 | * 3/1999 | Giel et al. | 455/343 |
| 5,894,298 | * 4/1999 | Hoeksma | 345/102 |
| 5,910,653 | * 6/1999 | Campo | 250/214 AL |

\* cited by examiner

*Primary Examiner*—Lee Nguyen
*Assistant Examiner*—Simon Nguyen
(74) *Attorney, Agent, or Firm*—Lyon & Lyon LLP (57) ABSTRACT

A wireless communication handset includes at least one processor and is configured to shutdown at least one of a display, display backlight and keypad backlight of the handset. A first timer is set when the display is turned on, and the first timer is started to time a display time-out period. If a keypad entry is made by a user during the timeout period, the first timer is reset. On the other hand, if a keypad entry is not made by the user before the time-out period expires, the display is shut off to conserve power. Likewise, a time-out period can be implemented to control automatic shut-off of other power-consuming features such as a display backlight and a keypad backlight. Features can be included to automatically re-enable shut-down features upon the occurrence of events such as the receipt of an incoming call, a keypad entry, or the opening of a flip panel on the handset.

32 Claims, 7 Drawing Sheets

SYSTEM AND METHOD FOR POWER CONSERVATION IN A WIRELESS COMMUNICATION HANDSET

BACKGROUND OF THE INVENTION

1. Field of the Invention

The present invention relates generally to wireless handsets and more specifically to a system and method for conserving power in wireless handsets.

2. Related Art

The advent of wireless personal communications devices has revolutionized the telecommunications industry. Cellular, PCS and other services provide wireless personal communications to businesses and individuals at home, in the office, on the road, and virtually anywhere the wireless network reaches. Wireless telephone subscribers no longer have to stop at pay telephones along the road, or wait until they return home or to the office to check messages and return important business calls. Instead, wireless subscribers carry out their day to day business from their cars, from the jobsite, while walking along the airport concourse, and just about anywhere their communication signals are accessible.

Thus, it is no surprise that since the introduction of the cellular telephone service, the number of wireless telephone subscribers has increased steadily. Indeed, the number of wireless telephone subscribers is staggering and continues to increase daily. In fact, many households have multiple wireless telephones in addition to their conventional land-line services.

Because of the enormous and continually increasing market size, there is fierce competition among hardware manufacturers and service providers. In an attempt to lure customers, most providers offer handsets with desirable features or attributes such as small size, light weight, longer battery life, speed dial, and so forth. More recent additions to the marketplace include multi-functional handsets that provide pocket-organizer functions integrated into the wireless handset.

As more and more features are added, and as package size diminishes, battery life becomes a more critical factor in the design of the handset. This criticality can be attributed to two causes: the addition of power-consuming features is outpacing advances in battery technology; and the smaller package sizes also require smaller battery dimensions, thus impacting battery life.

SUMMARY OF THE INVENTION

The present invention is directed toward a system and method for providing power saving features in an electronic device such as a wireless communication handset. Because wireless communication handsets are typically battery-operated devices, it is desirable that power saving features be provided to extend battery life, thus enhancing the usefulness of the device. As such, the various aspects of the invention provide power saving features such as selective shut-off for device displays, display back lights, and keypad back lights. According to one aspect of the invention, the device display is operated with a timeout feature that powers down the device display during periods of time when it is likely that the display is not needed. According to one aspect of the invention, when the device is turned on a timer is set that automatically turns off the display after a predetermined time. The display can be reactivated for a given timeout period based on user action such as keypad inputs. Thus, when a user depresses a key on a keypad, the display will turn on or remain on for a predetermined period of time. The display will automatically turn off after this predetermined time to conserve power. Because many users rely on the display to provide an indication of whether the device is turned on, an alternative power-on indicator can be provided for time periods when the display is turned off. This alternative power-on indicator can be an intermittent indicator such as a flashing LED that flashes or is illuminated at predetermined intervals.

Similarly, another aspect of the invention disables display and keypad back lights during periods of time when such back lights are not likely to be needed. For example, if the device is being operated during daylight hours, the back light for the display or keypad can be left off. Additionally, for periods of time where the back lights are needed, these back lights can be operated on timers similar to that described above for the display, to enable the back lights to be turned off after predetermined time intervals when back lighting is not likely to be needed by the user.

Thus, these various aspects of the invention that can be implemented individually or in combination can provide power saving features to an electronic device such as a wireless communication handset.

DETAILED DESCRIPTION OF THE PREFERRED EMBODIMENTS

1. Introduction and Overview

The present invention is directed toward a system and method for conserving power in portable devices such as, for example, wireless communication handsets. One or more power-saving features can be included to help conserve power in applicable electronic devices. As a result of these power saving features, battery life can be extended for battery-operated devices or power savings in general can be garnered.

According to one feature, a visual display of the electronic device can be set to shut off after a predetermined time period has elapsed. According to another feature, a keypad, back light or display back light can also be programmed to shut off after a predetermined time period has elapsed. Preferably, the time period is triggered based on inactivity of a user of a device. Alternative criteria can be established to set or reset shut-off time-out periods as discussed in more detail below.

2. Example Environment

Before describing the invention in detail, it is useful to describe a simple example environment in which the invention can be implemented. One such example environment is a portable, wireless handset such as, for example, a cellular, PCS, radio, or other wireless communication device. Such devices often include a keypad or other user interface for control and data entry of the device, as well as a display to provide information to the user regarding the communication or regarding information entered by the user on the keypad. The power saving features of the invention can be used to conserve power by performing operations such as disabling the display when not needed, and disabling a back light for the display and the keypad when not needed.

Wireless communication handsets such as those that would benefit from the features of the present invention, can be implemented in a number of different configurations with a number of different architectures. In fact, as will become apparent to one of ordinary skill in the art after reading this description, implementation of the features of the present invention is not dependent on a particular or specific architecture of the communication device. However, to facilitate description of the features, an example wireless communication device is described with reference to FIG. 1.

Figure 1:
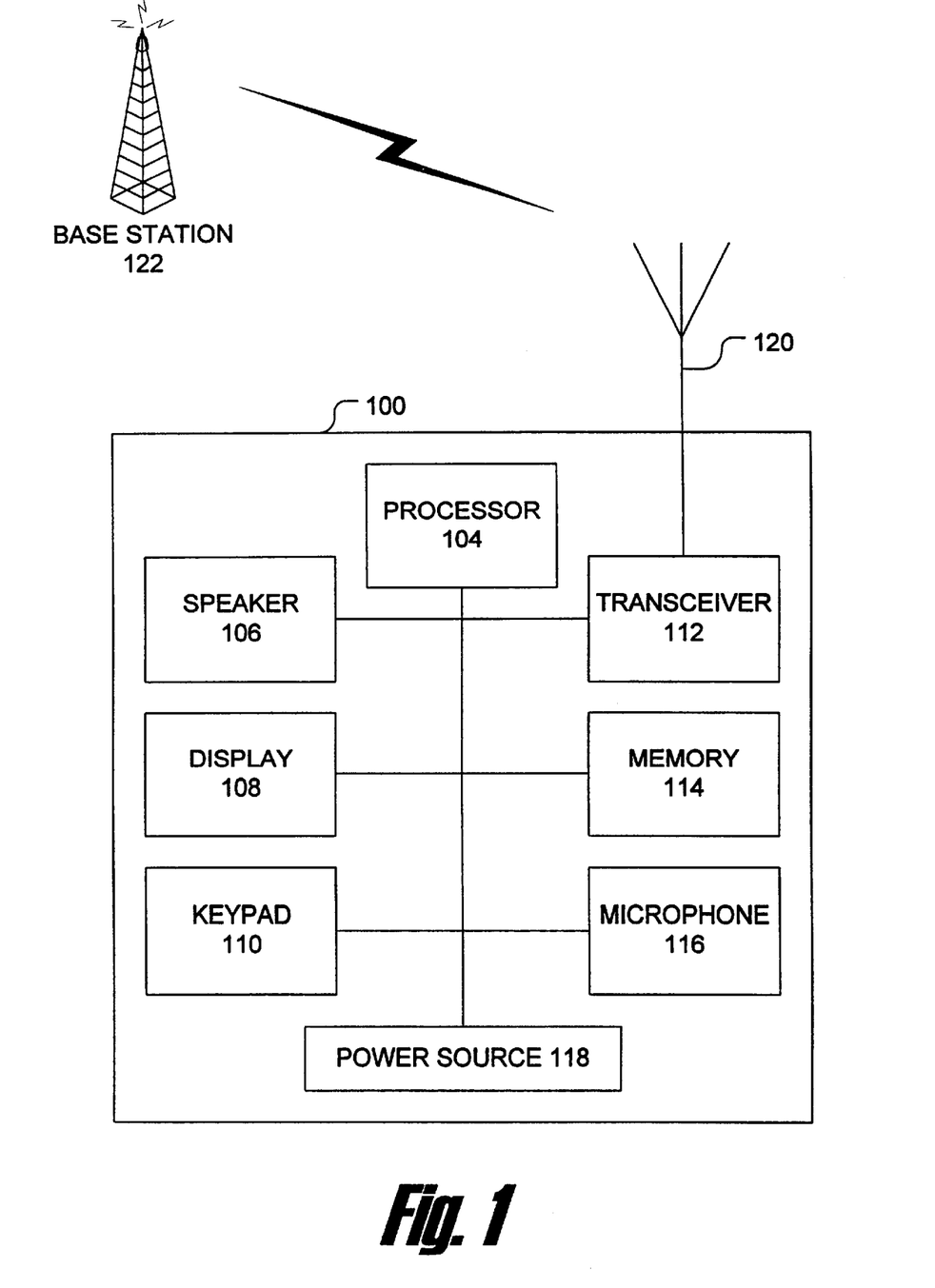
FIG. 1 is a diagram illustrating an example wireless communication device.

Referring now to FIG. 1, the wireless communication device 100 includes a processor 104, a speaker 106, a display 108, a keypad 110, a transceiver 112, a memory 114, a microphone 116, a power source 118 and an antennae 120. Wireless communication handset 100 can be configured to communicate with other communications devices such as, for example, a base station 122 or other communication device. Contemporary communication handsets typically include one or more processors 104 to control the operation and the features of the handset. Processor 104 typically has associated therewith computer program code running on the processor to carry out the functionality of the device.

Memory 114 such as RAM, ROM, or other memory, can be interfaced with the processor to store the program code and to provide other storage space for data or other information useful in executing the program code as well as in carrying out functions of the handset. In fact, the features and functionality of the present invention can be implemented using hardware, software, or a combination thereof, and such software can run on any various hardware components or a processor such as processor 104.

Communication handsets 100 typically also include a transceiver 112. Transceiver 112 provides a transmitter to transmit voice and data information via antenna 120 to a recipient communication device such as, for example, base station 122. Transceiver 112 typically also includes a receiver to receive voice and data communication from another communication device (e.g., base station 122) and to provide the received voice and data information to the user or to facilitate internal functionality of the handset.

User interface portions of the typical wireless communication handset 100 include a speaker 106, a display 108, a keypad 110, and a microphone 116. Microphone 116 accepts voice or other audio information from the user, converts this information to electrical signals such that they can be transmitted by the transceiver to a recipient. Likewise, speaker 106 converts electrical signals received by transceiver 112 into audio information that can be heard by a user of the wireless communication device 100. Display 108 can be used to display information to the user such as, for example, call information, keypad entry display, signal presence and signal strength display, battery life display, or any other information useful to the user. Display 108 can include any type of display, but is preferably a liquid crystal display (LCD) due to the LCD's low power consumption characteristics. Display 108 can also include other visual displays such as, for example, light emitting diode (LED) indicators or other visual indicators.

Keypad 110 can be implemented using a numeric or an alphanumeric keypad and can also include special function keys. In one embodiment, keypad 110 includes back lighting such that information on the keys, such as labels, can be viewed by the user in low light or dark conditions. Many electronic devices, including wireless communication devices, include a flip panel (not illustrated) that can be closed to conceal some or all of the keys on the keypad.

Power source 118 is used to provide power to one or more of the components of the wireless communication handset 100. Power source 118 can be implemented, for example, using rechargeable batteries such as NiCad or NiMH rechargeable batteries. Other power sources can be included in addition to or in place of batteries.

The invention is described herein in terms of this example environment. Description in these terms is provided for ease of discussion only. After reading the description herein, it will become apparent to one of ordinary skill in the art that the present invention can be implemented in any of a number of different electronic devices where it is desirable to conserve power.

3. Power Saver Features

The present invention provides several features that can be included with a portable electronic device such as a wireless communication handset. These features can be implemented individually or collectively to enable conservation of power in the electronic device. Three of the features that can be implemented with an electronic device include a display shut-off feature, a display back light shut-off feature, and a keypad back light shut-off feature. Each of these features are described according to one or more embodiments of the invention.

Figure 2:
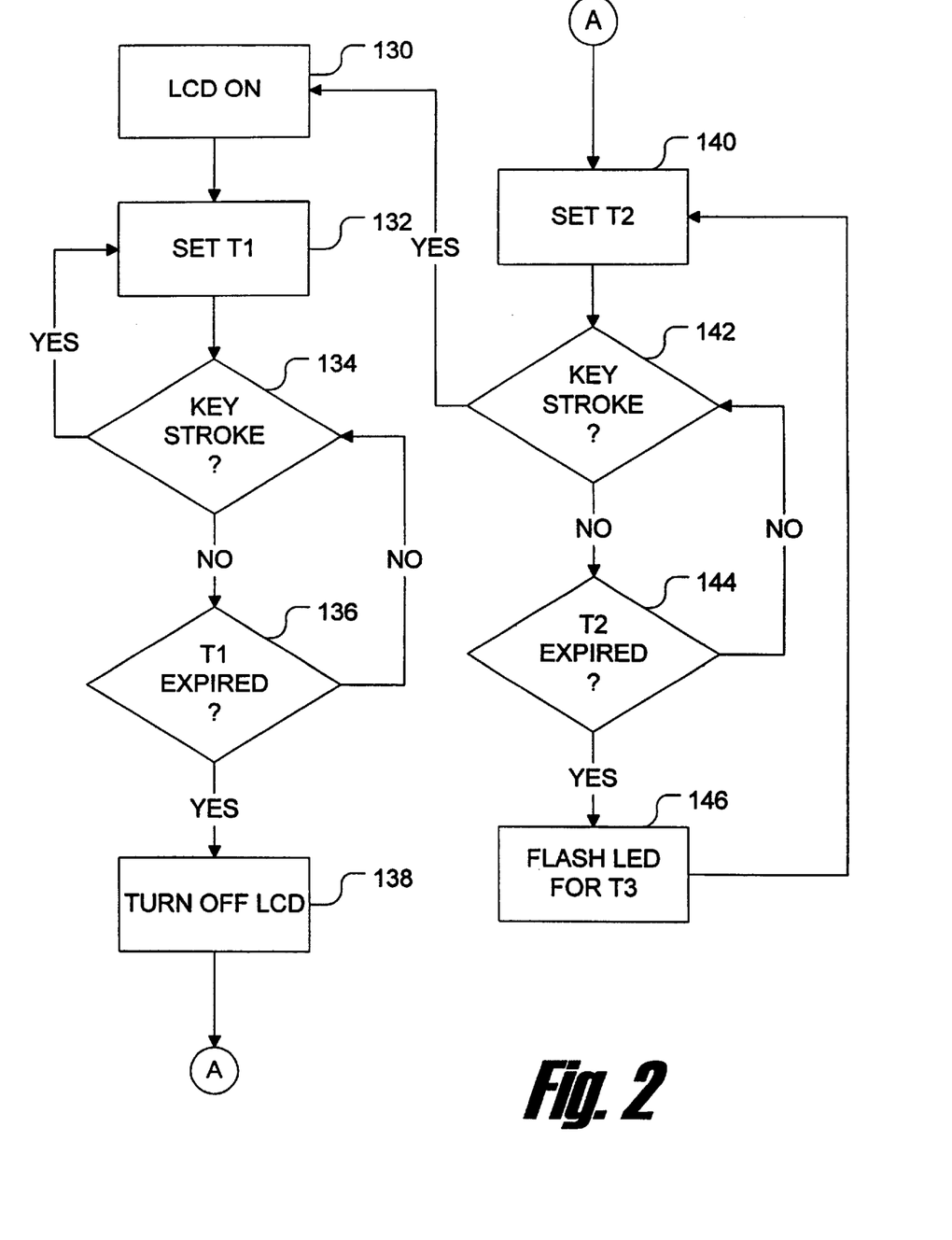
FIG. 2 is an operational flow diagram illustrating a process for disabling or shutting off a display according to one embodiment of the invention.

FIG. 2 is an operational flow diagram illustrating a process for disabling or shutting off a display according to one embodiment of the invention. This process is described in terms of an LCD display implemented with a wireless communication handset. However, after reading this description, it will become apparent to one of ordinary skill in the art how to implement this process in an alternative electronic device or with a different type of display. Referring now to FIG. 2, in a step 130 the LCD display is on. The display may have been turned on by the user upon powering up the wireless communication handset or through some other activity that would cause the LCD display to be turned on.

In a step 132, a timer is set to a predetermined time value referred to as T1. The timer begins counting time until time T1 has expired. If time T1 has expired and the user has not entered a keystroke on the device, the liquid crystal display is turned off. This is illustrated by steps 134, 136, and 138. Thus, if the LCD display is on and the user is not entering information via the keypad, the LCD display will automatically turn off after a time T1 has expired. One advantage of this aspect of the invention is that typically the user is not viewing information on the display while the user is not entering keystrokes on the keypad. Instead, the user is either in communication with another party (e.g., "on the phone")

at the time or the handset is resting somewhere. Because the user is not typically desiring to view the display at this time, the display is turned off after a set time T1 has expired, thus conserving power without hindering the user's interaction with the device.

However, if in step 134 it is determined that the user is accessing the keypad, time T1 is reset in step 132 to allow the display to remain on for time T1 while the user is accessing the keypad. Thus, the user will have the benefit of the display while the user is entering information via the keypad.

In one embodiment, the depression of any key on the keypad turns on the display and causes the entry of the keypad to be accepted. In alternative embodiments, the first keystroke made while the display is off will turn on the display and that keystroke will not be registered or accepted by the processor. Thus, in this alternative embodiment, the first keystroke is treated as a screen-on only keystroke and is not a data entry keystroke. In yet another embodiment, a special display-on key can be provided on the keypad to enable the user to activate the display without causing data to be entered via a keypad activity.

FIG. 2 also illustrates a process for implementing another feature that can be used to alert the user that the handset is powered on even if the display is turned off. Preferably, this feature is not accessed unless the display is turned off, because this feature itself consumes power and is not needed as long as the display is on. Thus, once the display is turned off in step 138, a timer T2 is set in a step 140. Timer T2 provides a time interval at which an LED or other indication device is illuminated in step 146 to alert the user or otherwise inform the user that the handset is powered on. This is illustrated by steps 140, 142, 144 and 146. More specifically, if the display is off and the user does not enter any keystrokes into the keypad, every time interval T2, the LED or other visual alert is illuminated to inform the user.

In one embodiment, an LED is set to flash for a time T3 or to be steadily illuminated for a time T3. In alternative embodiments, a small beep or other tone can be provided instead of or in addition to the visual alert to remind the user that the device is still on.

In the embodiment illustrated in FIG. 2, if a keystroke is entered during time interval T2, as illustrated by step 142, the display is powered on and the process begins again at step 130. Again, in this embodiment, the LED or other power-on alert is not activated as long as the display is active. Preferably, the LED or other visual alert is provided outside of any area that may be covered by a flip panel such that the visual alert can be viewed by the user when the device is in its closed configuration.

Figure 3:
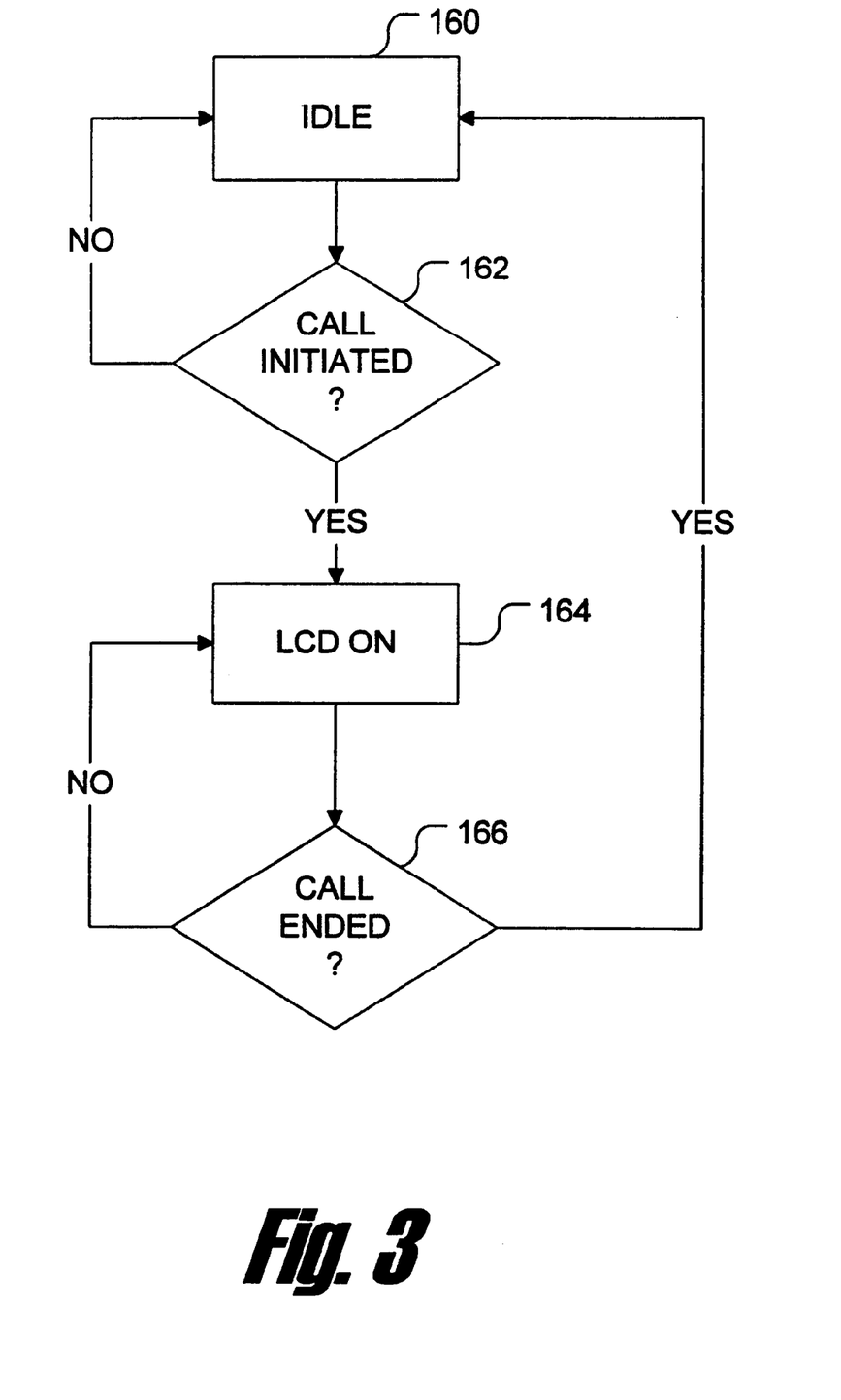
FIG. 3 is an operational flow diagram illustrating a process for automatically turning on a display on upon receipt of an incoming call according to one embodiment of the invention.

Another feature that can be provided in conjunction with the display-off power saving feature is the ability to automatically turn the display on upon receipt of an incoming call, or upon the opening of the flip panel. One process for turning on the display upon receipt of a call is illustrated in FIG. 3 according to one embodiment of the invention. Many wireless handsets include features such as caller ID or other features that provide useful information to the user upon receipt of an incoming call. Many users may prefer to view this information when a call comes in. In fact, many users will view this information prior to answering an incoming call. As such, one useful aspect of this feature is that the display can be powered on when a call comes in to allow the user to view the display before the user answers the call.

Referring now to FIG. 3, in a step 160 the handset is in the idle mode. That is, the handset is powered on but is not currently in use. In a step 162, if a call is initiated (e.g., if a call is received) the display device is powered as illustrated by step 164.

In one embodiment, the display remains on for the duration of the call. Thus, in step 166, when the call ends, the display is turned off and the phone returns to its idle state. Note that it is not necessary for the display to remain on for the entire duration of the call. In fact, it is not uncommon for a user to not view the display for the entire duration of a call once the call has been answered. Thus, in one embodiment the display can be shut off during the call to provide additional power savings. In one implementation, the display can be shut off as soon as the call is answered by the user. In an alternative embodiment, the display can be shut off after a timeout period has expired, similar to the process illustrated in FIG. 2. This timeout period may be triggered from the initial receipt of the call, from the time at which the call is actually answered or accepted, or from some other triggering event that starts the timeout period counting.

In yet another embodiment, the display may be turned on again automatically after the call has ended. This may be advantageous if the user wishes to view data about the call after the call is completed. For example, the user may wish to view the call duration at the completion of the call. This turn-on may be initiated by a keystroke at the end of the call such as by pressing the "end" button. Alternatively, this feature can be activated on the closing of the flip cover. Of course, it is advantageous to have the display on a timeout for this instance as well. The timeout can be implemented similar to that illustrated and described with respect to FIG. 2.

Figure 4:
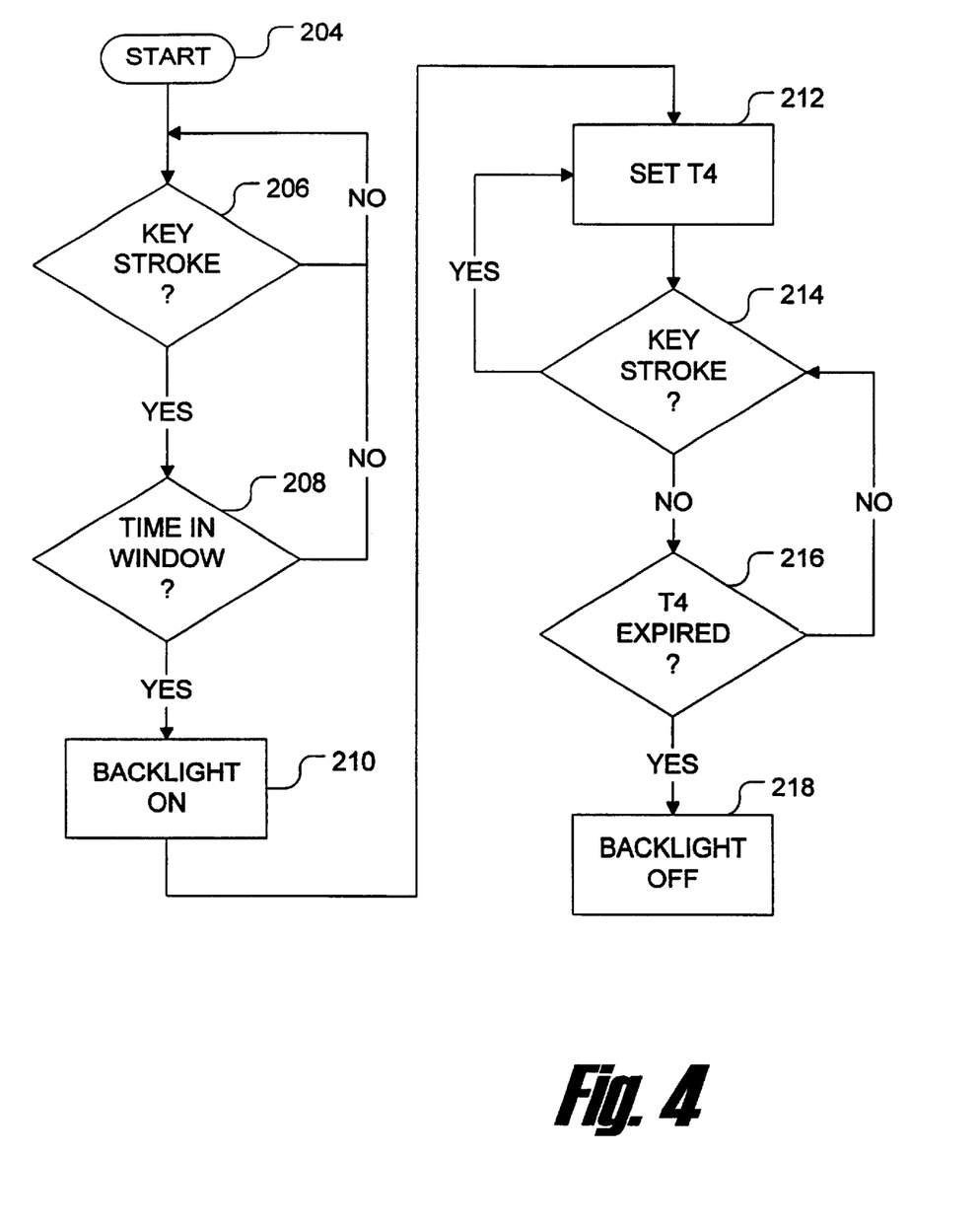
FIG. 4 is an operational flow diagram illustrating a process for disabling a display back light according to one embodiment of the invention.

Many handsets include a feature that provides a back light for the LCD or other display to enable the LCD to be viewed in low light or dark conditions. Obviously, it is not necessary that the back light be illuminated in the day time, when the display is typically clearly visible during normal light conditions. As such, another feature of the invention provides for the disabling of the back light during daylight hours. FIG. 4 is an operational flow diagram illustrating a process for disabling the back light according to one embodiment of the invention. Preferably, in this process the back light is not used while the display is off. Thus, when shutting off of the display by any means including via a timeout as described above with reference to FIG. 2, the back light is also disabled regardless of the time of day or the present lighting conditions.

In the embodiment illustrated in FIG. 4, the back light remains off until a keystroke is entered by the user in a step 206. Upon entry of a keystroke, if the current time is within a defined time window, the back light is turned on. This is illustrated by steps 206, 208 and 210. In this embodiment, a time window can be defined that sets the bounds for night time or darkness operating times. Thus, if the current time is within this time window, it is possible that the handset is being operated in the dark, and thus the back light is enabled. In one embodiment, the time window can be defined manually by user input. In an alternative embodiment, the time window can be defined based on internal clock and calendaring features of the handset to automatically determine a darkness window. For example, functionality may be provided to allow the device to automatically determine the hours of darkness based on the time of the year. Additionally, where the handset has location-determining abilities, the window can be further refined to include an updating of the window parameters based on the actual position of the handset within a given time zone. However, this level of accuracy is likely not necessary for this simple feature.

As a result of this function, the back light is allowed to remain off unless it is likely that it will be needed due to low-light conditions. Alternatively, in another embodiment, instead of using a time window to determine whether the phone is likely being operated in low-light conditions, an inexpensive photo sensor can be included with the device to sense the presence or absence of light. Thus, instead of looking to determine whether the time is within a given window in step 208, the system can simply determine whether the light sensed by a photo sensor is above or below a particular threshold.

Because the back light does consume power, it is advantageous to also have the back light on a timer such that it can be automatically turned off after a predetermined time. Thus, a process for providing this timeout feature with the back light is also described in FIG. 4. In a step 212, when the back light is turned on, a timer T4 is set. The entry of keystrokes by the user in step 214 continues to reset the timer such that the back light remains on while the user is accessing the keypad. Once T4 expires in step 216, the back light is turned off in a step 218. This embodiment allows the user to view the display while accessing the keypad and provides for powering off the back light and conserving power when the display is no longer needed. In one embodiment, the backlight is shutoff whenever the display is shut off. As with the display shut-down feature, the various keystroke combinations or features can be provided for powering on the back light. This can include a special display-on key as well. Also, in one embodiment, opening the flip panel is sufficient to trigger the display light in low light conditions.

Figure 5:
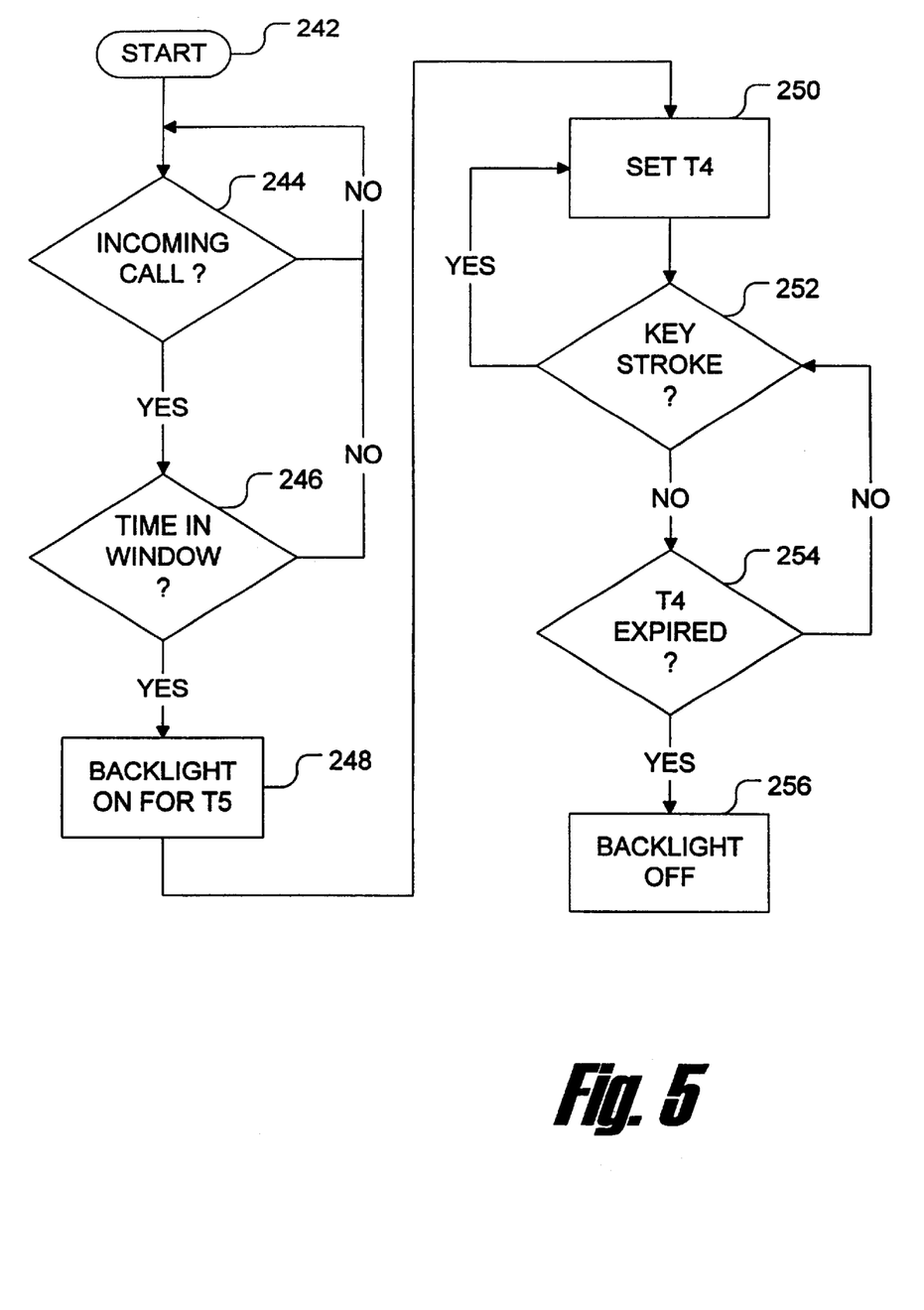
FIG. 5 is an operational flow diagram illustrating a process for automatically turning on a display backlight upon receipt of an incoming call according to one embodiment of the invention.

As described above with reference to the LCD shut-off features, it is useful or advantageous for the user to be able to view the display when an incoming call is received. Thus, a feature of the invention turns on the back light upon receipt of an incoming call, allowing the user to view the display in low-light conditions. FIG. 5 illustrates a process for this feature according to one embodiment of the invention. Referring now to FIG. 5, when an incoming call is detected, if the current time is within the predetermined window, the back light is turned on. Preferably, in one embodiment, the back light is turned on for a set period of time, T5. This is illustrated by steps 244, 246 and 248. If, however, the call is received during daytime or light conditions, the back light is not turned on, as illustrated by steps 244 and 246.

As with this scenario where the back light is illuminated upon the entry of a keystroke, the back light triggered by an incoming call can be set on a timer allowing the back light to be automatically turned off unless a keystroke is entered within a given timeout period. This is illustrated by steps 250, 252, 254 and 256. In one embodiment, the back light and display can be turned off automatically upon acceptance of the call by the user. That is, as soon as the user answers the call, the display and the back light can be turned off to conserve power. Additionally, different time intervals can be provided for T5 and T4.

Figure 6:
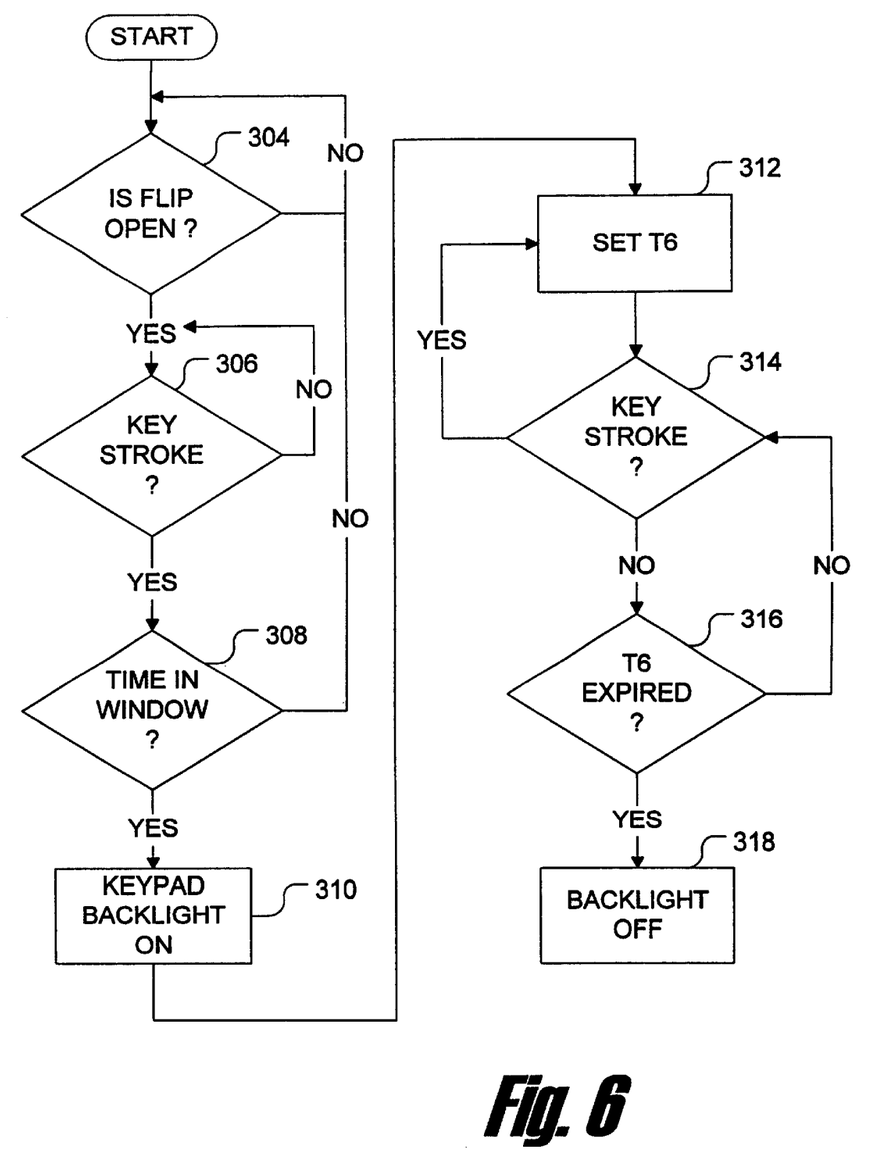
FIG. 6 is an operational flow diagram illustrating a process for selectively providing a keypad back light according to one embodiment of the invention.

Yet another feature that can be provided with the invention is the ability to selectively provide a back light for the keypad of the handset. FIG. 6 is an operational flow diagram illustrating a process for selectively providing a keypad back light according to one embodiment of the invention. As stated above, many handsets include a flip cover that can be closed to shield the keypad from inadvertent entries.

Thus, if the handset includes a flip cover, step 304 is implemented to determine whether the flip cover is open. If the flip cover is not open, it is not likely that the keypad back light would be useful if enabled.

As with the LCD back light feature, the keypad back light is activated if a keystroke is entered while the time is within the predefined time period or window as illustrated by steps 306, 308, and 310. Note also that the keypad back light can be similarly activated if the time is within the predefined window upon receipt of an incoming call. In some embodiments, this feature may be omitted as most users do not access the keypad to accept the call other than where a keystroke is required to answer the call (e.g., by depressing the "send" key).

As with the other power-down features described above, the keypad back light can also be set on a timer triggered by keystrokes. Thus, if the timeout period expires without the entry of a keystroke, the back light is ultimately powered off. This is illustrated by steps 312, 314, 316 and 318.

Note that timers described herein are described in terms of different timers for different functions. However, these timers can all be set for the same or different time intervals depending on anticipated user habits. Additionally, additional or alternative timers can be implemented to differentiate between different keystroke entries, or keystroke entries during the access of different features or functions of the device. For example, a different keystroke timer can be implemented for regular keypad features and voice mail keypad features. This may be chosen to reflect a scenario where the time between keystroke entries when accessing voice mail features of a handset can be greater than keypad entries made while the user is placing a call. For example, the user may place keystrokes to enter voice mail and then press a key to listen to a first message. If the message is lengthy, it may be a long period of time before the user again accesses the keypad to skip, save, delete, forward, or otherwise act on the message. Thus, in one embodiment, a timer triggered on voice mail keystrokes may be implemented as being longer than a timer triggered on regular keypad keystrokes. Similarly, depression of a "send" button may trigger a shorter timer, as the "send" button is oftentimes the last button entered in placing or accepting a call. In other words, after the "send" button is pressed, in most scenarios, the user is not viewing the display or using the keypad, but immediately begins speaking on the handset. Similarly, other time periods can be chosen for other keys, other sections of the keypad, or different time periods can be chosen based on the application being accessed by the device. This allows flexibility in establishing timeout periods to optimize the power-down features based on anticipated user habits.

Additionally, a feature can be implemented where the display is not activated if the user is in the voice mail mode. This is because in many scenarios the user does not view the display while accessing voice mail. As such, there is no need to have the display active while in the voice mail mode. Thus, in this embodiment, only the keypad is illuminated during voice mail mode. Again, the keypad back lighting can be disabled during daylight hours to further conserve power. Once the user exits voice mail mode, the power saving features can return to normal operation.

Although the power saving features of the display, display back light, and keypad back light have been described somewhat separately in this document, it will be apparent to one of ordinary skill in the art after reading this description that they can be implemented individually or in any combination to provide power saving features for an electronic device such as a wireless handset.

Figure 7:
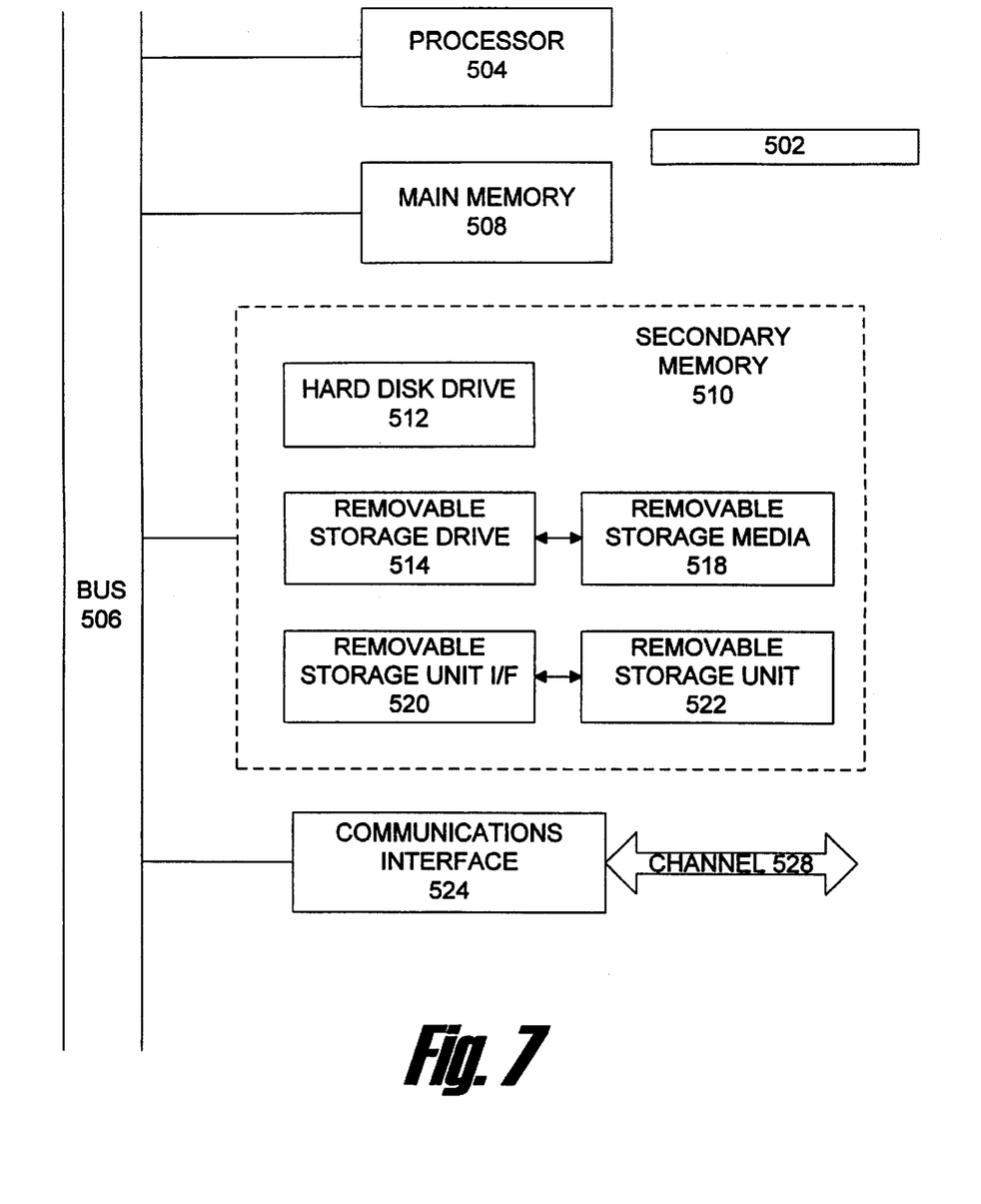
FIG. 7 is a diagram illustrating an example processor-based system according to one embodiment of the invention.

The various embodiments and features of the invention described above may be implemented using hardware, software or a combination thereof and may be implemented using a computing system having one or more processors. In fact, in one embodiment, these elements are implemented using a processor-based system capable of carrying out the functionality described with respect thereto. An example processor-based system 502 is shown in FIG. 7. The computer system 502 includes one or more processors, such as processor 504. The processor 504 is connected to a communication bus 506. Various software embodiments are described in terms of this example computer system. After reading this description, it will become apparent to a person skilled in the relevant art how to implement the invention using other computer or processor systems and/or architectures. The functionality of the invention as described above is not dependent on a particular computer or processor architecture.

Processor-based system 502 can include a main memory 508, preferably random access memory (RAM), and can also include a secondary memory 510. The secondary memory 510 can include, for example, a hard disk drive 512 and/or a removable storage drive 514, representing a floppy disk drive, a magnetic tape drive, an optical disk drive, etc. The removable storage drive 514 reads from and/or writes to a removable storage medium 518 in a well known manner. Removable storage media 518, represents a floppy disk, magnetic tape, optical disk, etc. which is read by and written to by removable storage drive 514. As will be appreciated, the removable storage media 518 includes a computer usable storage medium having stored therein computer software and/or data.

In alternative embodiments, secondary memory 510 may include other similar means for allowing computer programs or other instructions to be loaded into computer system 502. Such means can include, for example, a removable storage unit 522 and an interface 520. Examples of such can include a program cartridge and cartridge interface (such as that found in video game devices), a removable memory chip (such as an EPROM, or PROM) and associated socket, and other removable storage units 522 and interfaces 520 which allow software and data to be transferred from the removable storage unit 518 to computer system 502.

Computer system 502 can also include a communications interface 524. Communications interface 524 allows software and data to be transferred between computer system 502 and external devices. Examples of communications interface 524 can include a modem, a network interface (such as, for example, an Ethernet card), a communications port, a PCMCIA slot and card, etc. Software and data transferred via communications interface 524 are in the form of signals which can be electronic, electromagnetic, optical or other signals capable of being received by communications interface 524. These signals are provided to communications interface via a channel 528. This channel 528 carries signals and can be implemented using a wireless medium, wire or cable, fiber optics, or other communications medium. Some examples of a channel can include a phone line, a cellular phone link, an RF link, a network interface, and other communications channels.

In this document, the terms "computer program medium" and "computer usable medium" are used to generally refer to media such as removable storage device 518, a disk capable of installation in disk drive 512, and signals on channel 528. These computer program products are means for providing software or program instructions to computer system 502.

Computer programs (also called computer control logic) are stored in main memory 508 and/or secondary memory 510. Computer programs can also be received via communications interface 524. Such computer programs, when executed, enable the computer system 502 to perform the features of the present invention as discussed herein. In particular, the computer programs, when executed, enable the processor 504 to perform the features of the present invention. Accordingly, such computer programs represent controllers of the computer system 502.

In an embodiment where the elements are implemented using software, the software may be stored in, or transmitted via, a computer program product and loaded into computer system 502 using removable storage drive 514, hard drive 512 or communications interface 524. The control logic (software), when executed by the processor 504, causes the processor 504 to perform the functions of the invention as described herein.

In another embodiment, the elements are implemented primarily in hardware using, for example, hardware components such as PALs, application specific integrated circuits (ASICs) or other hardware components. Implementation of a hardware state machine so as to perform the functions described herein will be apparent to persons skilled in the relevant art(s). In yet another embodiment, elements are implemented using a combination of both hardware and software.

4. Conclusion

While various embodiments of the present invention have been described above, it should be understood that they have been presented by way of example only, and not limitation. Thus, the breadth and scope of the present invention should not be limited by any of the above-described exemplary embodiments, but should be defined only in accordance with the following claims and their equivalents.

We claim:

1. A wireless communication handset having at least one processor and computer program code means executable thereon and configured to shutdown a display, display backlight and keypad backlight of the handset, said computer program code means comprising:

first computer program code means for
setting a first timer when the display is turned on and enabling said first timer to start a display time-out period,
resetting said first timer if a keypad entry is made by a user, and
disabling the display if a keypad entry is not made by the user before said first time-out period expires;

second computer program code means for
checking for daylight conditions when the display is turned on,
enabling the display backlight only if daylight conditions are not present, and
disabling said display backlight after a display backlight time-out period has expired;

third computer program code means for
checking for daylight conditions when the handset is accessed,
enabling the keypad backlight for handset access only if daylight conditions are not present, and
disabling said keypad backlight after a keypad backlight time-out period has expired; and fourth computer program code means for
determining whether the user is using the handset to access voicemail; and
changing the time-out period duration for one or more of said time-out periods during voicemail access.

2. The wireless communication handset of claim 1, wherein said display backlight time-out period and said keypad backlight timeout period are established by said first timer.

3. The wireless communication handset of claim 1, wherein said display backlight time-out period and said keypad backlight timeout period are established by one or more timers different from said first timer.

4. The wireless communication handset of claim 1, wherein said display backlight time-out period is established by setting and enabling a second timer.

5. The wireless communication handset of claim 1, wherein said computer program code means for checking for daylight conditions comprises computer program code means for comparing the output of a photosensor to a predetermined threshold level.

6. The wireless communication handset of claim 1, wherein said computer program code means further comprises means for resetting one or more of said time-out periods upon detection of a keypad entry.

7. The wireless communication handset of claim 1, wherein said computer program code means further comprises means for enabling one or more of said display, display backlight and keypad backlight upon detection of a keypad entry.

8. The wireless communication handset of claim 1, wherein said computer program code means further comprises means for enabling one or more of said display, display backlight and keypad backlight upon detection of an incoming call.

9. The wireless communication handset of claim 1, wherein said computer program code means further comprises means for enabling one or more of said display, display backlight and keypad backlight upon detection of a flip panel opening.

10. The wireless communication handset of claim 1, further comprising a dedicated key to turn on at least one of the display, display backlight and keypad backlight.

11. A wireless communication handset having at least one processor and computer program code means executable thereon and configured to shutdown a display, display backlight and keypad backlight of the handset, said computer program code means comprising:
  first computer program code means for
    setting a first timer when the display is turned on and enabling said first timer to start a display time-out period,
    resetting said first timer if a keypad entry is made by a user, and
    disabling the display if a keypad entry is not made by the user before said first time-out period expires;
  second computer program code means for
    checking for daylight conditions when the display is turned on,
    enabling the display backlight only if daylight conditions are not present, and
    disabling said display backlight after a display backlight time-out period has expired;
  third computer program code means for
    checking for daylight conditions when the handset is accessed,
    enabling the keypad backlight for handset access only if daylight conditions are not present and
    disabling said keypad backlight after a keypad backlight time-out period has expired; and
  computer program code means for checking for daylight conditions comprises computer program code means for:
    checking a current time of day; and
    comparing said current time of day with a time window to determine whether said current time of day is inside or outside said time window;
    wherein said time window defines a window of time indicative of lighting conditions.

12. The wireless communication handset of claim 11, wherein said time window defines start and end times for a daily period of relative darkness.

13. A wireless communication handset having at least one processor and computer program code means executable thereon and configured to shutdown a display, display backlight and keypad backlight of the handset, said computer program code means comprising:
  first computer program code means for
    setting a first timer when the display is turned on and enabling said first timer to start a display time-out period,
    resetting said first timer if a keypad entry is made by a user, and
    disabling the display if a keypad entry is not made by the user before said first time-out period expires;
  second computer program code means for
    checking for daylight conditions when the display is turned on,
    enabling the display backlight only if daylight conditions are not present, and
    disabling said display backlight after a display backlight time-out period has expired;
  third computer program code means for
    checking for daylight conditions when the handset is accessed,
    enabling the keypad backlight for handset access only if daylight conditions are not present, and
    disabling said keypad backlight after a keypad backlight time-out period has expired; and
  fourth computer program code means for disabling data entry from a first keystroke, where said first keystroke is made while the display is off.

14. A wireless communication handset having at least one processor and computer program code means executable thereon and configured to shutdown a display, display backlight and keypad backlight of the handset, said computer program code means comprising:
  first computer program code means for
    setting a first timer when the display is turned on and enabling said first timer to start a display time-out period,
    resetting said first timer if a keypad entry is made by a user, and
    disabling the display if a keypad entry is not made by the user before said first time-out period expires;
  second computer program code means for
    checking for daylight conditions when the display is turned on,
    enabling the display backlight only if daylight conditions are not present, and
    disabling said display backlight after a display backlight time-out period has expired;
  third computer program code means for
    checking for daylight conditions when the handset is accessed,
    enabling the keypad backlight for handset access only if daylight conditions are not present, and
    disabling said keypad backlight after a keypad backlight time-out period has expired; and fourth computer program code means for flashing an indicator at a predetermined time interval when the handset is turned on and the display is turned off to indicate to a user that handset power is on.

15. A wireless communication handset comprising:
a processor;
a display coupled to said processor;
a keypad coupled to said processor;
a transceiver coupled to said processor;
a computer program product including a computer useable medium and having computer program logic recorded thereon for enabling the processor to shut off the display after a timeout period has expired, said computer program logic including
computer program code logic for setting a display timer when the display is turned on and enabling said display timer to start a display time-out period,
resetting said display timer if a keypad entry is made by a user, and
disabling the display if a keypad entry is not made by the user before said display time-out period expires; and
a backlight, and wherein said computer program product further comprises computer program logic for:
checking for daylight conditions;
disabling said backlight only if daylight conditions are present; and
disabling said backlight after a backlight time-out period has expired;
said computer program logic for checking for daylight conditions comprises computer program logic for:
checking a current time of day; and
comparing said current time of day with a time window to determine whether said current time of day is inside or outside said time window;
wherein said time window defines a window of time indicative of lighting conditions.

16. The wireless communication handset of claim 15, wherein said backlight comprises at least one of a keypad backlight and a display backlight.

17. The wireless communication handset of claim 16, wherein a display backlight time-out period and a keypad backlight timeout period are established by said display timer.

18. The wireless communication handset of claim 16, wherein a display backlight time-out period and a keypad backlight timeout period are established by one or more timers different from said display timer.

19. The wireless communication handset of claim 15, wherein said time window defines start and end times for a daily period of relative darkness.

20. The wireless communication handset of claim 15, wherein said computer program logic for checking for daylight conditions comprises computer program code means for comparing the output of a photosensor to a predetermined threshold level.

21. The wireless communication handset of claim 15, wherein said computer program logic further comprises logic for resetting one or more of said time-out periods upon detection of a keypad entry.

22. The wireless communication handset of claim 15, wherein said computer program logic further comprises computer program logic for enabling one or more of said display, display backlight and keypad backlight upon detection of an incoming call.

23. The wireless communication handset of claim 15, wherein said computer program logic further comprises computer program logic for enabling one or more of said display, display backlight and keypad backlight upon detection of a keypad entry.

24. The wireless communication handset of claim 15, wherein said computer program logic further comprises computer program logic for enabling one or more of said display, display backlight and keypad backlight upon detection of a flip panel opening.

25. A wireless communication handset comprising:
a processor;
a display coupled to said processor;
a keypad coupled to said processor;
a transceiver coupled to said processor;
a computer program product including a computer useable medium and having computer program logic recorded thereon for enabling the processor to shut off the display after a timeout period has expired, said computer program logic including
computer program code logic for setting a display timer when the display is turned on and enabling said display timer to start a display time-out period,
resetting said display timer if a keypad entry is made by a user, and
disabling the display if a keypad entry is not made by the user before said display time-out period expires; and
said computer program logic further comprises computer program logic for:
determining whether the user is using the handset to access voicemail; and
setting a different length timer for one or more of said time-out periods for voicemail access.

26. A wireless communication handset comprising:
a processor;
a display coupled to said processor;
a keypad coupled to said processor;
a transceiver coupled to said processor;
a computer program product including a computer useable medium and having computer program logic recorded thereon for enabling the processor to shut off the display after a timeout period has expired, said computer program logic including
computer program code logic for setting a display timer when the display is turned on and enabling said display timer to start a display time-out period,
resetting said display timer if a keypad entry is made by a user, and
disabling the display if a keypad entry is not made by the user before said display time-out period expires; and
said computer program logic further comprises a computer program logic for disabling data entry from a first keystroke, where said first keystroke is made while the display is off.

27. A wireless communication handset comprising:
a processor;
a display coupled to said processor;
a keypad coupled to said processor;
a transceiver coupled to said processor;
a computer program product including a computer useable medium and having computer program logic recorded thereon for enabling the processor to shut off the display after a timeout period has expired, said computer program logic including computer program code logic for setting a display timer when the display is turned on and enabling said display timer to start a display time-out period, resetting said display timer if a keypad entry is made by a user, and disabling the display if a keypad entry is not made by the user before said display time-out period expires; and said computer program logic further comprises computer program logic for flashing an indicator at a predetermined time interval when the handset is turned on and the display is turned off to indicate to a user that handset power is on.

28. In a wireless communication handset, a method for conserving power, the method comprising:

setting a display timer when a handset display is turned on and enabling said display timer to start a display time-out period;

resetting said display timer if a keypad entry is made by a user;

disabling the display if a keypad entry is not made by the user before said display time-out period expires;

checking for daylight conditions;

disabling a backlight if daylight conditions are present;

disabling a backlight after a backlight time-out period has expired; and wherein said checking for daylight conditions comprises:
checking a current time of day; and comparing said current time of day with a time window to determine whether said current time of day is inside or outside said time window;

wherein said time window defines a window of time indicative of lighting conditions.

29. The method of claim 28, wherein said backlight comprises at least one of a keypad backlight and a display backlight.

30. The method of claim 28, wherein said checking for daylight conditions comprises comparing the output of a photosensor to a predetermined threshold level.

31. The method of claim 28, further comprising enabling one or more of said display, display backlight and keypad backlight upon detection of at least one of a keypad entry, and incoming call and a flip panel opening.

32. In a wireless communication handset, a method for conserving power, the method comprising:

setting a display timer when a handset display is turned on and enabling said display timer to start a display time-out period;

resetting said display timer if a keypad entry is made by a user; disabling the display if a keypad entry is not made by the user before said display time-out period expires;

determining whether the user is using the handset to access voicemail; and setting a different length timer for one or more of said time-out periods for voicemail access.

* * * * *